(12) United States Patent
Werschler et al.

(10) Patent No.: US 12,655,892 B2
(45) Date of Patent: Jun. 16, 2026

(54) LINEAR DRIVE, LONGITUDINAL ADJUSTMENT UNIT HAVING SUCH A LINEAR DRIVE

(71) Applicant: IMS GEAR SE & CO. KGAA, Donaueschingen (DE)

(72) Inventors: Marco Werschler, Radolfzell (DE); Marcel Mittelbach, Schluchsee (DE); Kenny Nietzel, Tuningen (DE); Johannes Weinert, Villingen-Schwenningen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 18/635,452

(22) Filed: Apr. 15, 2024

(65) Prior Publication Data

US 2024/0352992 A1 Oct. 24, 2024

(30) Foreign Application Priority Data

Apr. 20, 2023 (EP) .................................... 23169063

(51) Int. Cl.
*F16H 19/04* (2006.01)
*B60N 2/06* (2006.01)
(52) U.S. Cl.
CPC .............. *F16H 19/04* (2013.01); *B60N 2/067* (2013.01); *F16H 2019/046* (2013.01)
(58) Field of Classification Search
CPC .... F16H 19/04; F16H 2019/046; B60N 2/067
See application file for complete search history.

(56) References Cited

U.S. PATENT DOCUMENTS 11,679,693 B2 * 6/2023 Werschler ............... F16H 25/18
297/344.1
11,761,519 B2 * 9/2023 Mittelbach ............. B60N 2/929
74/112
(Continued)

FOREIGN PATENT DOCUMENTS

DE 3640197 A1 10/1987
DE 4208948 C2 9/1992
(Continued)

OTHER PUBLICATIONS

Search report issued on Oct. 5, 2023 for parallel pending European patent application No. 23 169063.7.

*Primary Examiner* — Minnah L Seoh
*Assistant Examiner* — Gregory T Prather
(74) *Attorney, Agent, or Firm* — Nath, Goldberg & Meyer; Jerald L. Meyer

(57) ABSTRACT

The present invention relates to a linear drive (1) having at least one toothed rack (20) oriented along a longitudinal axis (L) and at least two slides (30) which are movable transversely to the longitudinal axis (L), and a drive shaft (60), wherein the at least two slides (30) are coupled to the drive shaft (60) in such a way that the at least two slides (30) each carry out at least one cyclic and out-of-phase movement in the course of one revolution of the drive shaft (60) and thereby push off by an operative contact at the at least one toothed rack (20) to generate propulsion in a direction of the longitudinal axis (L), wherein the linear drive (1) has at least one compensation means (15), by means of which the operative contact between at least one of the at least two slides (30) and the at least one toothed rack (20) is preloaded.

18 Claims, 7 Drawing Sheets

(56) References Cited

U.S. PATENT DOCUMENTS

| | | | | |
|---|---|---|---|---|
| 11,813,967 B2 * | 11/2023 | Hofschulte | ........... | F16H 31/007 |
| 11,865,951 B2 * | 1/2024 | Werschler | ............. | F16H 31/007 |
| 2022/0234724 A1 * | 7/2022 | Schlipf | ................... | F16H 19/04 |
| 2024/0351485 A1 * | 10/2024 | Mrewed | ................. | F16H 25/12 |

FOREIGN PATENT DOCUMENTS

| | | | | |
|---|---|---|---|---|
| DE | 19642655 C1 | 6/1998 | | |
| DE | 19815283 A1 | 10/1999 | | |
| DE | 102004013009 A1 | 10/2005 | | |
| DE | 102006052936 A1 | 5/2008 | | |
| JP | H0684054 U | 12/1994 | | |
| JP | 2022143776 A | 10/2022 | | |
| WO | WO-2008028540 A1 * | 3/2008 | ............. | F16H 25/06 |
| WO | 2020/245255 A1 | 12/2020 | | |
| WO | WO-2020245036 A1 * | 12/2020 | ............. | B60N 2/067 |

* cited by examiner a)

b)

a)

b)

a)

b)

LINEAR DRIVE, LONGITUDINAL ADJUSTMENT UNIT HAVING SUCH A LINEAR DRIVE

FIELD

The present invention relates to a linear drive having the features of claim 1, to a longitudinal adjustment unit for a seat having the features of claim 16, and to a motor vehicle having the features of claim 17.

BACKGROUND

Linear drives are known from the prior art in various configurations and are commonly used as longitudinal adjustment units for adjusting the position of a seat in motor vehicles. Longitudinal adjustment units typically interact with a lower rail fixed on a chassis and an upper rail arranged within said lower rail, it being possible to drive the upper rail by the longitudinal adjustment unit in a motorized manner and said rail being coupled to the seat. The adjustment of the upper rail by means of the longitudinal adjustment unit is typically carried out in the prior art by means of a spindle which is arranged within the upper rail and is supported in each case at its first end and second end.

Longitudinal adjustment units of this type are known, for example, from DE 36 40 197 A1, DE 42 08 948 C2, DE 196 42 655 C2, DE 198 15 283 A1, DE 10 2004 013 009 A1, and DE 10 2006 052 936 A1.

Due to the high requirements for a linear drive which, in addition to the adjustment function as a longitudinal adjustment unit, must also ensure accident safety, such linear drives have different types of design requiring different production methods and processes.

It has been shown that a play-free linear movement can be implemented only with great effort and that breaking loads of such linear drives can be adapted only with great effort. Furthermore, known longitudinal adjustment units are of limited use when implementing new seat concepts in vehicles. Furthermore, it was found that play of the linear drives is lost due to wear.

SUMMARY

This is where the present invention comes into play.

It is the object of the invention to propose an improved linear drive which eliminates in an expedient manner the disadvantages known from the prior art. Furthermore, a linear drive with a particularly compact design is to be specified, which enables a smooth and an almost play-free linear movement at the same time as a variable and adaptable breaking load. In addition, the proposed linear drive should be able to implement a high adjustment speed and have improved wear characteristics.

These objects are achieved by a linear drive having a longitudinal adjustment unit, and a motor vehicle having the linear drive.

The linear drive has at least one toothed rack oriented along a longitudinal axis, at least two slides which are movable transversely to the longitudinal axis (L), and a drive shaft. The at least two slides are coupled to the drive shaft in such a way that the at least two slides each carry out at least one cyclic and out-of-phase movement in the course of one revolution of the drive shaft and thereby push off by an operative contact at the at least one toothed rack to generate propulsion in a direction of the longitudinal axis. According to the invention, it is furthermore provided that the linear drive has at least one compensation means, by means of which the operative contact between at least one of the at least two slides and the at least one toothed rack is spring-loaded or preloaded.

The present invention is based on the idea of proposing a linear drive that has at least one compensation means, by means of which tolerances and/or wear can be compensated. The at least one compensation means is configured such that the operative contact between at least one of the at least two slides and the at least one toothed rack is spring-loaded, in particular preloaded. If tolerances and/or wear are/is present, the at least one toothed rack and/or at least one of the at least two slides can carry out a compensating movement by means of the at least one compensation means. The compensation means can thus create an approximately play-free linear drive, which is preferably particularly smooth-running and low-noise and also preferably has a long service life.

A refinement of the present invention provides that the at least one compensation means spring-loads, in particular preloads, at least one of the at least two slides and/or the at least one toothed rack in a transverse axis which is oriented substantially transversely to the longitudinal axis. For example, by preloading the at least one toothed rack transversely to the longitudinal axis, the at least one toothed rack can be subjected to a displacement, preferably limited at least on one side by stops, through which displacement possible play due to tolerances and/or wear can be compensated. In other words, the at least one toothed rack can carry out the compensating movement counter to the cyclic movement of the at least one of the at least two slides.

According to a preferred refinement of the present invention, at least two toothed racks are provided. The at least two toothed racks can, for example, be arranged on their own rail or on a common rail.

In addition, according to a further development, it has proven to be advantageous if the at least two toothed racks are arranged opposite one another in such a way that a slotted link is formed between the at least two toothed racks. At least one of the at least two slides can preferably engage in this slotted link and, in the course of the cyclic movement, can alternately push off at the two oppositely arranged toothed racks. The slotted link can thus be designed in the manner of a wave-shaped or zigzag-shaped groove along the longitudinal axis and comprises two opposing profile surfaces, which are provided by the opposing two toothed racks.

The two opposing profile surfaces can have any number of teeth, each of which is formed from a rising and falling tooth flank, the point or section between two adjacent tooth flanks being referred to here as a transition. The transitions of two opposite profile surfaces of a slotted link are preferably arranged in alignment approximately transversely to the longitudinal axis.

As provided by to a preferred refinement, at least one of the at least two toothed racks is preloaded against the other and opposite one of the at least two toothed racks by the at least one compensation means. Preferably, only one of the two oppositely arranged toothed racks is fixedly mounted relative to the other of the two toothed racks, while one of the two toothed racks can carry out a compensating movement by means of the at least one compensation means. The at least one of the at least two slides that engages in the slotted link is fixed between the two toothed racks and any play, for example due to tolerances or wear, can be compensated for.

A refinement of the present invention provides that the at least one slide comprises at least one pin. Preferably, the at least one slide is in operative contact with the at least one toothed rack via the at least one pin. The at least one pin can preferably be formed integrally with a slide body or attached to the slide body. For example, the at least one pin can be inserted or pressed into a receptacle of the slide body.

The at least one pin can, for example, be designed in the manner of a tooth, the shape of which corresponds to the profile of the at least one toothed rack. Such a tooth is advantageous, for example, for forming surface contact between the at least one slide and the at least one toothed rack. Alternatively, the pin can also be round, polygonal or the like in cross section.

A refinement of the present invention provides that the at least one pin projects into the guide link in one pin axis each and is fixed in the slotted link between the two oppositely arranged toothed racks, preferably in the longitudinal axis. For this purpose, the respective pin axis is preferably oriented in the alignment of a normal vector of a rail plane, which is spanned by the longitudinal axis and the direction of the cyclic movement.

A preferred refinement of the present invention provides that the at least one pin is preloaded by means of the at least one compensation means in a plane transverse to the cyclic movement of at least one of the at least two slides, and/or that the at least one pin is preloaded in the pin axis by the at least one compensation means. The compensation means preloads the operative contact between the slide and the respective toothed rack.

According to a preferred refinement of the present invention, the slotted link has two opposite and converging profile surfaces. In other words, the groove-shaped slotted link does not have a constant width, but rather the width of the slotted link either increases and/or decreases in the orientation of the pin axis.

In addition, it has proven to be advantageous if the at least one pin has a shape that corresponds to the tapering profile surfaces. For example, the at least one pin can be pyramid-shaped and/or conical at least in sections, whereby the at least one pin is in operative contact with the respective toothed rack along the pin axis, the operative contact preferably being a line or even more preferably a surface contact.

In particular, it has proven to be advantageous if the slotted link has converging profile surfaces and the at least one pin has a shape that corresponds to the converging profile surfaces. By preloading the at least one pin by the at least one compensation means, the operative contact between the at least one pin and the at least one tooth profile is preloaded. As a result of the preload, for example when there is wear, the respective at least one pin is displaced along the pin axis by the compensation means, whereby wear and/or possibly also tolerances can be compensated for.

As provided by a further refinement of the present invention, the at least one pin is formed from at least two individual pins which are arranged in a common plane perpendicular to the longitudinal axis. Two individual pins are also described in connection with this invention as a single pin pair.

The at least two individual pins are preferably in operative contact with the respective toothed rack alternately during a cyclic movement. According to a preferred configuration, the individual pins have a common and even more preferably integrally formed base, wherein the base can also be formed, for example, by the slide body. The two individual pins have a lower rigidity than one pin and can compensate for tolerances and/or wear caused by a deformation, in particular an elastic deformation, in particular by elastic deformation.

A preferred refinement of the present invention provides that the at least one compensation means is arranged between at least two individual pins or a single pin pair and preloads the at least two individual pins.

Furthermore, a refinement of the present invention provides that the at least one pin comprises a casing and a pin body. According to an advantageous refinement of the present invention, the at least one compensation means is arranged between the casing and the pin body. Preferably, several compensation means, preferably circumferentially symmetrical, are arranged between the casing and the pin body, the compensation means enabling an elastic displacement of the casing relative to the pin body. This makes it possible, for example, to compensate for tolerances and/or wear.

A refinement of the present invention also provides that the casing is held in a rotationally fixed manner on the—preferably cylindrical—pin body. The casing is preferably diamond-shaped and the compensation means are arranged either in the corner regions of the diamond or preferably on side edges. In order to prevent the casing from rotating relative to the pin body, the pin body can have at least one protruding rib, which serves for a form-fitting transmission of torque between the pin body and compensation means. The casing can therefore not only carry out a compensation movement in a plane perpendicular to the pin axis, but also a torsional movement.

In addition, it has proven to be advantageous if several toothed racks are arranged in a row along the longitudinal axis, whereby a travel path along the longitudinal axis for the linear drive can be extended as desired. The toothed racks lined up along the longitudinal axis can preferably be connected to one another in a form-fitting manner. For example, the toothed racks lined up along the longitudinal axis can be connected in a form-fitting manner in the manner of a dovetail connection. A coupling piece can also be provided, which connects two adjacent toothed racks together in the longitudinal axis. For example, the coupling piece can be formed by a compensation means, wherein the coupling piece can be made, for example, from an elastic polymer, rubber or a soft-elastic metal. In order to soften the compensation for any tolerances and/or wear, the respective at least one toothed rack can be slightly movable in the longitudinal axis.

A refinement of the present invention provides that the operative contact between the at least one toothed rack and at least one of the at least two slides is a surface contact, a line contact or a radio contact. The surface contact is brought about, for example, in that the slide has running surfaces that correspond at least in sections to the toothed rack and which cooperate with the respective toothed rack or profile surface. A line contact is brought about, for example, by a cylindrical section on the slide, in particular the pin, and a radio contact can be brought about, for example, by a correspondingly curved configuration of either the at least one toothed rack and/or the slide, in particular the pin.

A refinement of the present invention provides that the at least one compensation means comprises an edge layer which is arranged on the at least one toothed rack and/or on the at least one slide. The edge layer can be made of a softer material, with the tooth flanks of the respective toothed rack preferably being sheathed with the edge layer to compensate for play. This also makes it possible to compensate for manufacturing or assembly tolerances between the individual contact surfaces of the slides and the toothed racks. In addition, it can be advantageous if the edge layer has improved sliding properties, whereby on the one hand the sliding friction between the slide and the respective toothed rack can be reduced and on the other hand the noise generation can be positively influenced. For example, the edge layer can be made of PTFE.

It is also conceivable to form the at least one edge layer on the slide. It is particularly preferred if the pin is covered with the edge layer. Furthermore, it can be advantageous if at least one of the at least two slides also has an edge layer in the area in which the mechanical coupling between the drive shaft and the respective slide takes place. The edge layer also allows the coupling between the respective slide or the drive shaft to be configured to be free of play and tolerances and/or wear can also be compensated for there.

In addition, the present invention relates to a longitudinal adjustment unit with a linear drive according to the invention.

A further aspect of the present invention relates to a motor vehicle with at least one such linear drive according to the invention.

BRIEF DESCRIPTION OF THE DRAWINGS

An exemplary embodiment according to the invention and refinements of the present invention are described in detail below with reference to the accompanying drawings. In the figures:

Identical or functionally identical parts or features are identified with the same reference numerals in the following detailed description of the figures. In addition, not all identical or functionally identical parts or features are provided with a reference numeral in the figures.

FIG. 1 shows an exemplary simplified and perspectively illustrated configuration of a linear drive 1, which can be used, for example, in a longitudinal adjustment unit 2 for a seat (not shown) of a motor vehicle (not shown).

Figure 1:
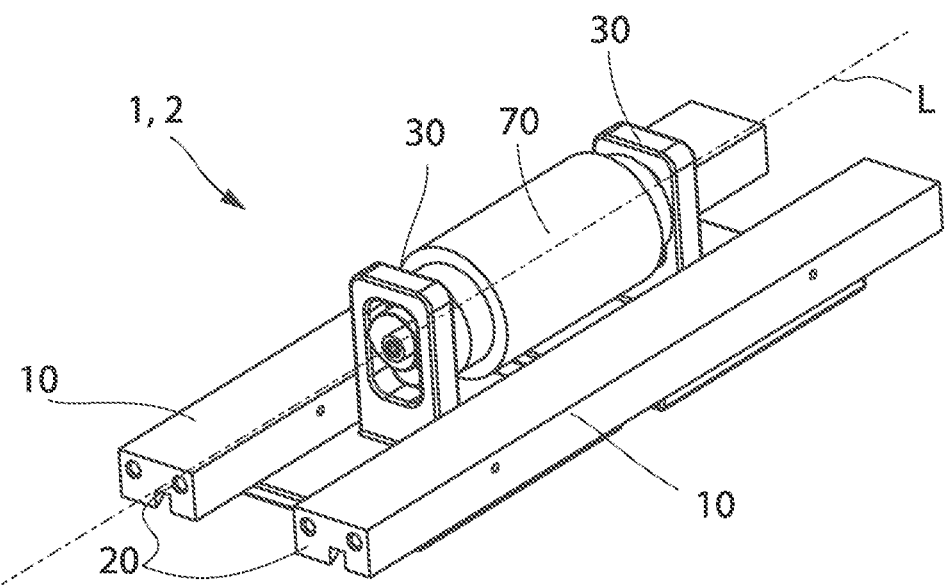
FIG. 1 shows a perspective representation of a linear drive with a drive shaft driven by a drive device, four toothed racks and two slides, which are coupled to the drive shaft in such a way that they each carry out a cyclical and out-of-phase movement in the course of one revolution of the drive shaft and are thereby push off by an operative contact at the at least one toothed rack to generate propulsion in a direction of the longitudinal axis.
Figure 2:
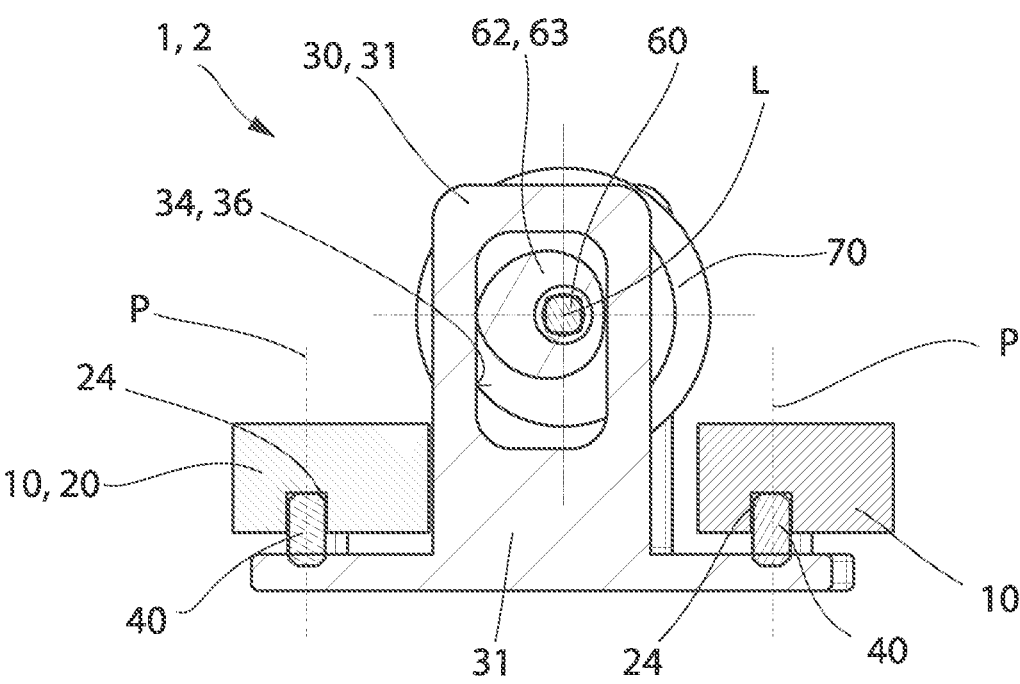
FIG. 2 shows a sectional representation of FIG. 1.

The linear drive 1 according to FIG. 1 comprises a rail 10, which is oriented along a longitudinal axis L, at least two slides 30, which—as shown in FIG. 2—are movable transversely to longitudinal axis L. Furthermore, the linear drive 1 comprises at least one drivable drive shaft 60, which is rotatable about an axis of rotation X.

The at least one rail 10 is oriented along longitudinal axis L, wherein, for example, longitudinal axis L can be predetermined by a vehicle longitudinal axis of the motor vehicle. Rail 10 has at least one toothed rack 20, and it should be noted that in the exemplary embodiment shown, linear drive 1 includes two rails 10, each with two toothed racks 20.

Figures 3, 4, 5:
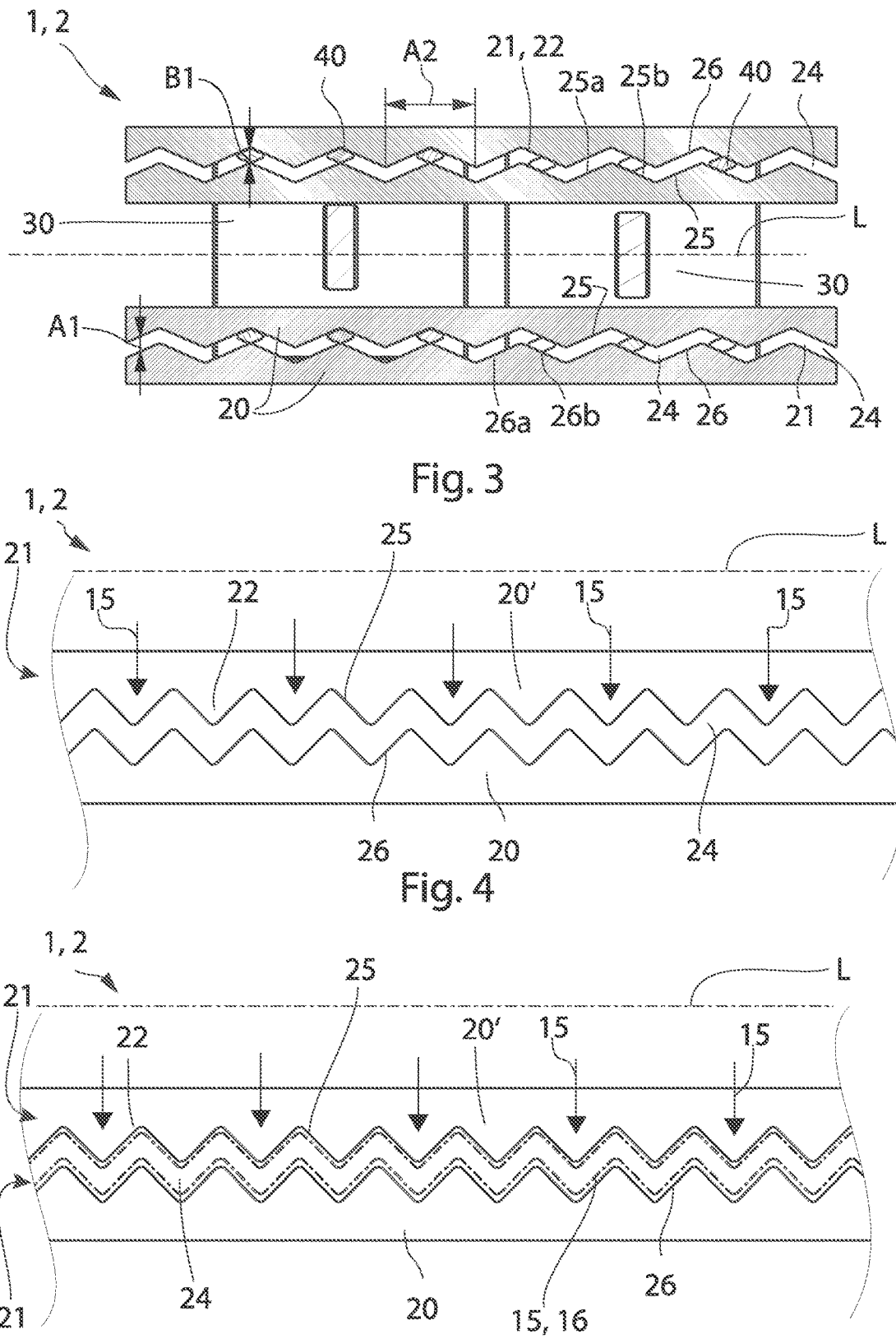
FIG. 3 shows a further sectional representation of FIG. 1.
FIG. 4 shows a greatly simplified, enlarged and schematic representation of the linear drive 1 according to a first exemplary embodiment, one of the two opposing toothed racks being spring-loaded and preloaded transversely to the longitudinal axis by a compensation means.
FIG. 5 shows a second exemplary embodiment, with an edge layer being provided on the tooth flanks of the toothed racks.

According to FIGS. 1 to 3, two toothed racks 20 are arranged opposite each other on a rail 10 in such a way that a slotted link 24 is formed between the at least two toothed racks 20, into which at least one of the at least two slides 30 engages, and in the course of the cyclic movement can be pushed off alternately at two oppositely arranged toothed racks 20. The slotted link 24 can be designed in the manner of a groove and comprises two opposing profile surfaces 25, 26, which are formed by the opposing two toothed racks 20.

Two toothed racks 20 preferably span a rail plane E, which is oriented parallel to longitudinal axis L.

The slotted link 24, designed as a groove or opening, extends in the direction of the normal vector into rail 10, as a result of which the opposite profile surfaces 25, 26 according to the first exemplary embodiment can be arranged parallel to the normal vector.

The slotted link 24 preferably has a constant slotted link depth.

DETAILED DESCRIPTION

Slotted link 24 according to the detailed illustration in FIG. 3 comprises two opposite profile surfaces 25, 26, which extend in a zigzag or wave shape at a constant distance A1 to form a tooth profile 21 with a plurality of teeth 22.

Teeth 22 have symmetrical flanks 25*a*, 25*b*, 26*a*, 26*b*, which extend on both sides between the tip of the tooth and the base of the tooth. Two adjacent tooth tips are arranged at a tooth spacing A2, or the length of a tooth 22 in the longitudinal axis corresponds to tooth spacing A2.

Tooth profile 21 can, as can be seen from FIGS. 1 and 2, among others, extend completely over the rail 10 along longitudinal axis L.

The exemplary embodiment according to the accompanying figures shows at least two slides 30, and it should be noted at this point that even a single slide 30 is sufficient to generate propulsion in a direction L1 or L2 of longitudinal axis L.

Two slides 30 of a linear drive 1 can, as shown in the exemplary embodiment according to FIGS. 1-3, be substantially identical in structure and can either be arranged in the longitudinal axis on opposite sides of the drive device or, in an embodiment not shown, on a single side of the drive device.

Respective slide 30 is drivingly coupled to drivable drive shaft 60 in such a way that respective slide 30 carries out at least one cyclic movement in the course of one revolution of drive shaft 60.

Slide 30 can have an opening or recess in the formed contact region 34. Contact region 34 preferably extends in the axis of rotation X and can have a width B2 and a height H2.

To generate the propulsion in a direction of longitudinal axis L, slide 30 engages in slotted link 24 of rail 10. For this purpose, slide 30 may comprise a running surface 45, which is set up to be in operative contact with the opposite profile surfaces 25, 26.

As can be seen in FIG. 3, running surface 45 can be formed on a pin 40, which engages from a base body 31 of slide 30 transversely to longitudinal axis L and perpendicular to rail plane E into slotted link 24 in a pin axis P.

Respective slide 30 can have several pins 40, with a distance A3 between two pins 40 in the longitudinal axis of a slide 30 corresponding to distance A1.

Figures 8, 9:
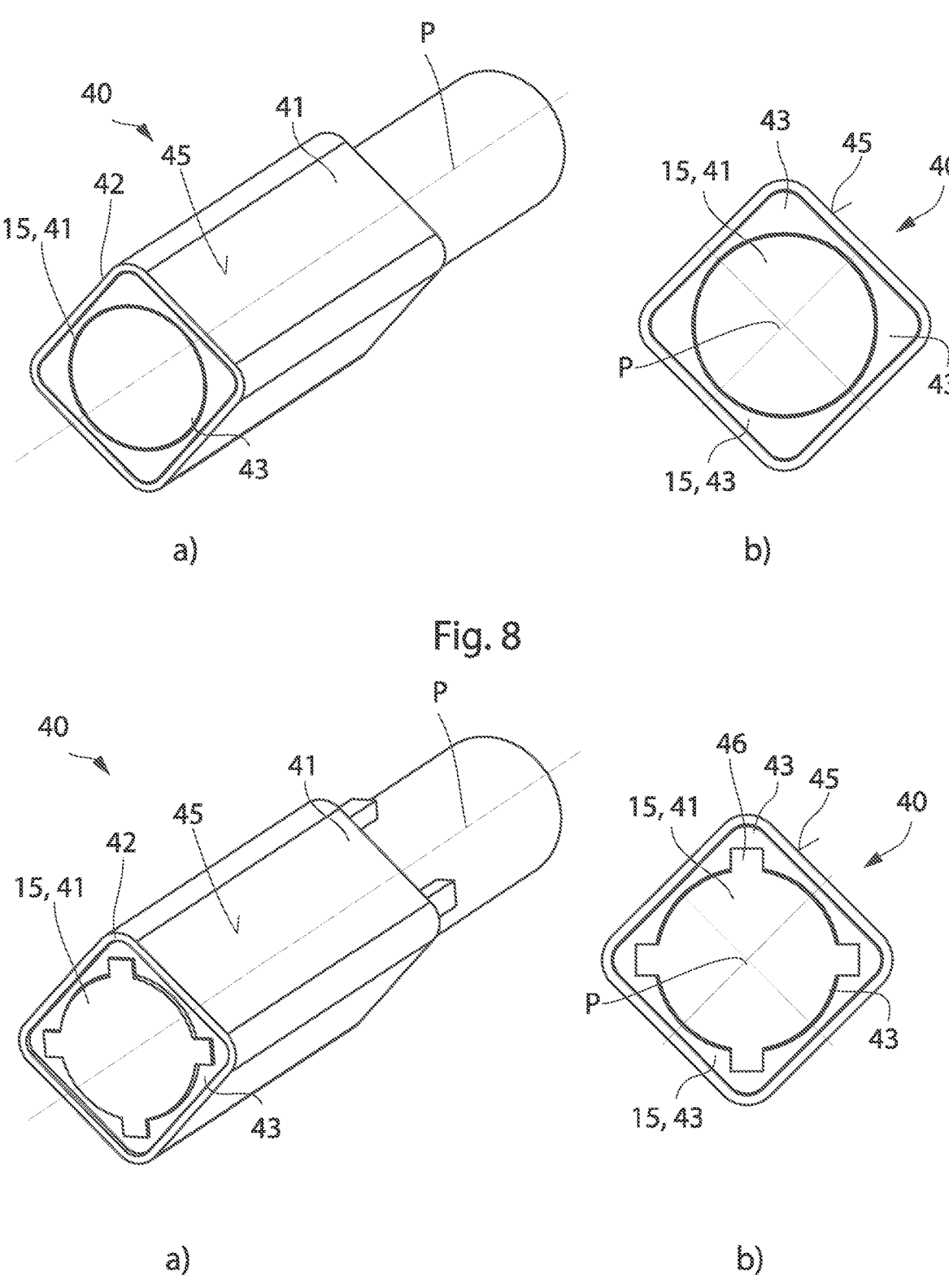
FIG. 8 shows a fifth exemplary embodiment analogous to FIG. 6.
FIG. 9 shows a sixth exemplary embodiment analogous to FIG. 6.
Figure 10:
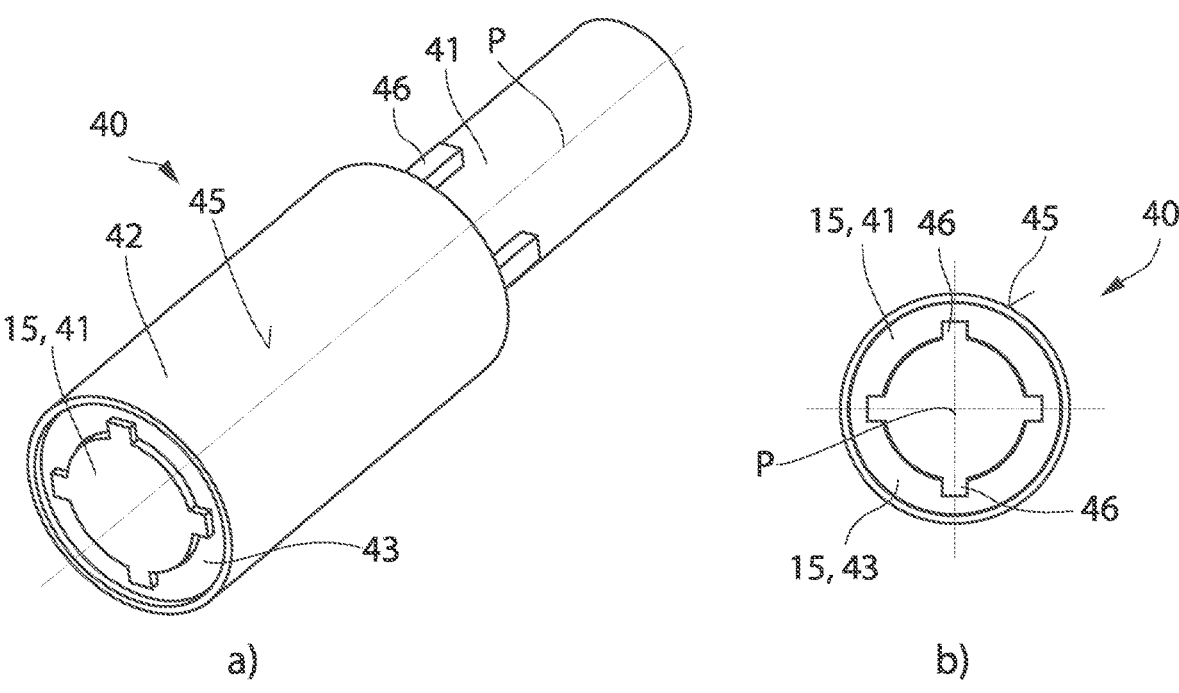
FIG. 10 shows a seventh exemplary embodiment analogous to FIG. 6.

Pin 40 can have a cuboid, diamond-shaped (see FIG. 3 to 7) or a round (see FIGS. 9 and 10) cross section and can be formed integrally with base body 31 or attached to base body 31 of slide 30, in particular inserted or pressed in.

As can be seen from FIG. 3, pin 40 has a width B1, which is measured transversely to longitudinal axis L. Width B1 preferably corresponds approximately to distance A1 between two profile surfaces 25, 26, i.e., B1≈A1.

Running surface 45 may have a surface with improved friction properties in order to reduce the friction between slotted link 24 and slide 30.

Slide 30, in particular at least one pin 40 of slide 30, is held in longitudinal axis L between two opposite profile surfaces 25, 26, preferably in a form-fitting manner. The form-fitting connection in longitudinal axis L between slide 30 and slotted link 24 can block unwanted movement or freewheeling of linear drive 1.

The coupling between drive shaft 60 and respective slide 30 can take place in different ways, and according to the exemplary embodiments presented here, the coupling can take place by guide means 62 which cooperate with slide 30, in particular with contact region 34. Slide 30 can have at least one contact surface 36 in contact region 34, which interacts with guide means 62.

Guide means 62 can, for example, as shown in the accompanying FIGS. 1-3, be designed as a camshaft disk 63 of a crankshaft or camshaft, and engage in the opening or recess of slide 30 and cooperate there with contact region 34.

Drive shaft 60 can be driven by a drive device 70, drive device 70 preferably being an electric drive, which is, even more preferably, coupled to drive shaft 60 via a gear (not shown).

Guide means 62 or camshaft disk 63 can be described as being substantially heart-shaped.

Guide means 62 or camshaft disk 63 has a running surface 64 which is formed in the direction of rotation at a distance from an axis of rotation X of drive shaft 60. The distance between running surface 64 and axis of rotation X changes in the direction of rotation and in such a way that the distance increases predominantly linearly in a direction of rotation in at least a first half and decreases linearly in at least a second half in the direction of rotation. Running surface 64 runs approximately spirally in the respective half, running surface 64 preferably being designed such that the distance between two diametrical sides, measured via the axis of rotation X, is approximately constant.

Due to the driving coupling of the at least one slide 30 with drive shaft 60, respective slide 30 is put at least in a linear and cyclical movement transversely to the longitudinal axis in the course of one revolution of drive shaft 60, the cyclic movement of respective slide 30 being in rail plane E or parallel to rail plane E. The double arrow in FIG. 3 is intended to illustrate the cyclic movement in rail plane E or parallel to the rail plane E of slide 30.

During the cyclic movement of the at least one slide 30, slide 30 alternately pushes off opposite profile surfaces 25, 26 in order to generate the propulsion in longitudinal axis L. In other words, slide 30 moves transversely to longitudinal axis L during at least one revolution of drive shaft 60 about axis of rotation X.

A complete cycle of movement comprises, starting from a starting position, a movement in a first direction Y1 and a change in movement to a second direction Y2 at a turning point. Movement in second direction Y2 continues until the next turning point. Then, there is a return to the starting position.

FIG. 4 shows the schematic representation of a linear drive 1 with a compensation means 15, through which play and/or wear can be compensated for, in an exemplary configuration.

In the exemplary embodiment shown, compensation means 15 can be formed by elastic spring means (not shown in detail), through which one of the two toothed racks 20 is preloaded against the other toothed rack 20 arranged on the opposite side. For illustrative purposes, compensation means 15 is shown using arrow lines.

For better understanding, the toothed racks in FIG. 4 are labeled with reference numerals 20 and 20', with toothed rack 20 being fixedly arranged, for example fixedly arranged on rail 10 (not shown), and the other toothed rack 20' being preloaded against toothed rack 20 by compensation means 15 transversely to longitudinal axis L.

By preloading toothed rack 20' relative to fixedly mounted toothed rack 20, pin 40 is fixed in slotted link 24 and the play and/or wear can be compensated for.

End stops (not shown) can be provided for toothed rack 20', through which the maximum displacement of toothed rack 20' transversely to longitudinal axis L is limited by compensation means 15. The end stops are intended to prevent the profile overlap between the two toothed racks 20, 20' from becoming too small.

A second exemplary embodiment of a linear drive 1 with a compensation means 15 can be seen in FIG. 5. The at least one compensation means 15 can comprise an edge layer 16 which is arranged on the at least one toothed rack 20 and/or on the at least one slide 30, in particular on its running surface(s) 45. Edge layer 16 can be formed of a softer material, with profile surfaces 25, 26 of respective toothed rack 20 preferably being sheathed with edge layer 16 to compensate for play. In addition, it can be advantageous if edge layer 16 has improved sliding properties, whereby the sliding friction and/or noise generation between slide 30 or its pins 40 and respective toothed rack 20 can be reduced. As in FIG. 5, compensation means 15 of the individual exemplary embodiments can be combined. For example, an edge layer 16 and preloading one of toothed racks 20' can be provided transversely to longitudinal axis L. These exemplary embodiments can also be combined in any way with the exemplary embodiments described below.

According to a configuration of linear drive 1, not shown, an edge layer 16 can be arranged on guide means 62 or camshaft disk 63 and/or on contact region 34 of slide 30. As a result, the mechanical coupling between drive shaft 60 and respective slide 30 can be configured to be approximately play-free and tolerances and/or wear can also be compensated for between guide means 62 and slide 30.

Figure 6:
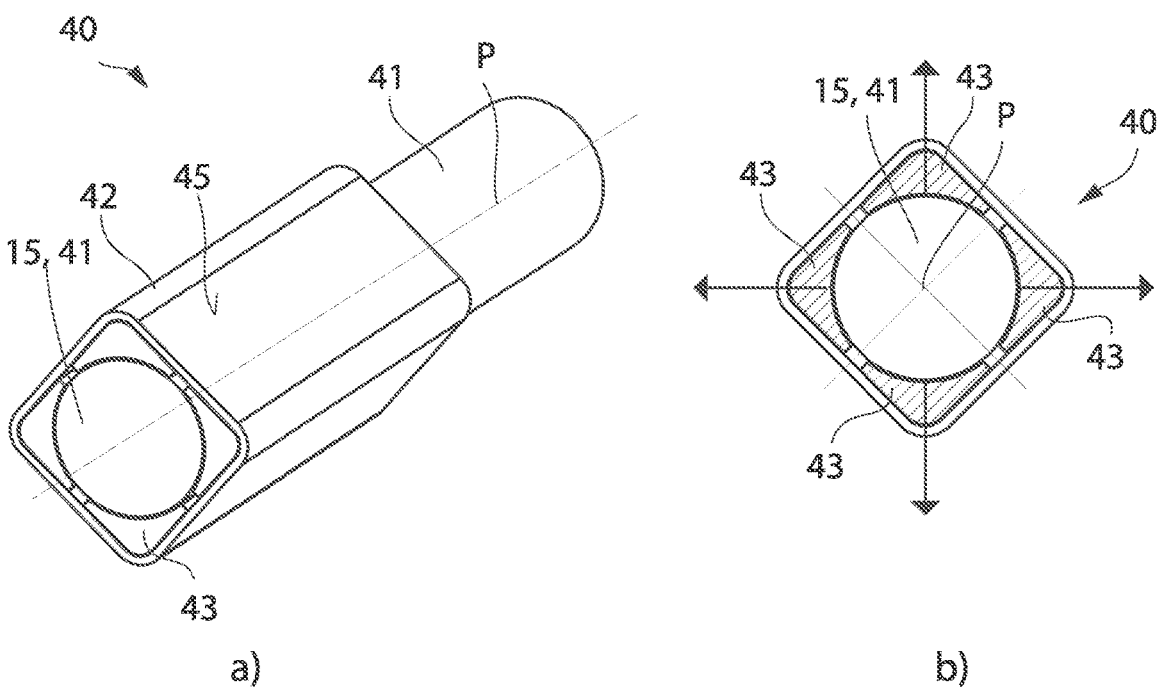
FIG. 6 shows a third exemplary embodiment and a detailed representation of a pin of a slide, at least one pin comprising a pin body and a casing, and the casing being preloaded by the compensation means.
Figure 7:
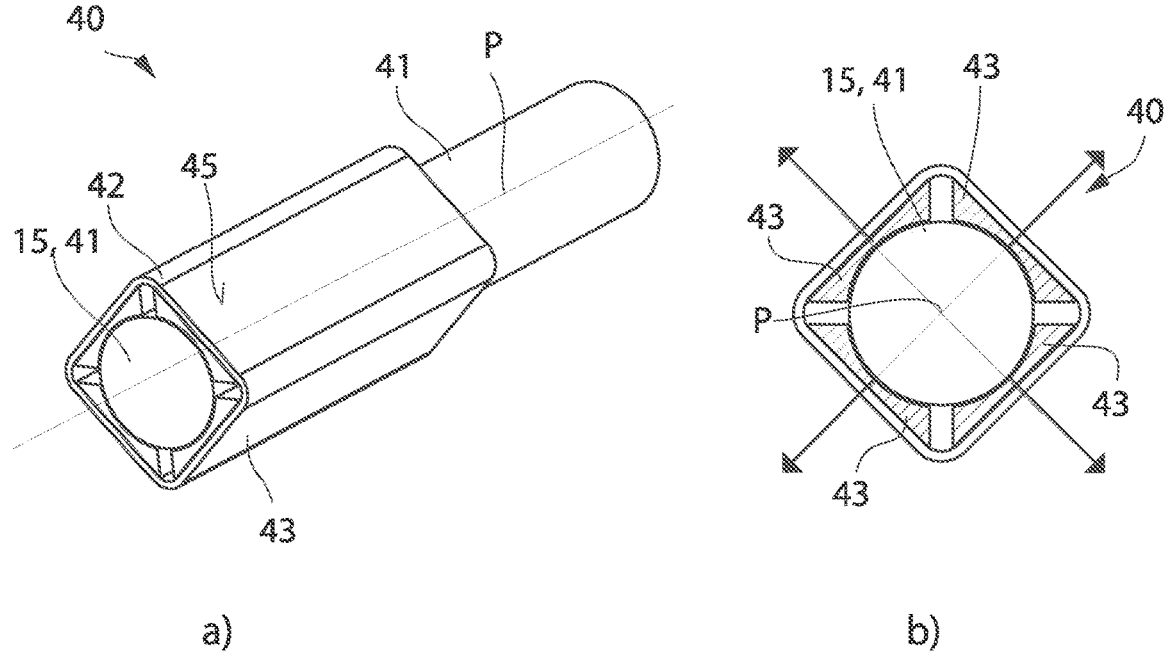
FIG. 7 shows a fourth exemplary embodiment analogous to FIG. 6.

FIG. 6 shows a compensation means 15 according to a third exemplary embodiment, wherein compensation means 15 is arranged on pin 40 of the at least one slide 30.

From the enlarged detailed representation of pin 40 according to FIGS. 6a and 6b it can be seen that respective pin 40 comprises a pin body 41 and a casing 42. Furthermore, individual segments 43 can be provided, via which casing 42 can be held supported on pin body 41. Casing 42 has running surfaces 45.

Pin body 41 can be a substantially cylindrical body, as shown. Casing 42 can be a diamond-shaped sleeve, see FIGS. 6-9, in the interior of which pin body 41 can be arranged. Alternatively, casing 42 can also have a round, in particular cylindrical or conical, external geometry according to FIG. 10.

Compensation means 15 can generate a preload-indicated by the arrows in FIG. 6b—through which individual segments 43 are pressed against casing 42. For example, compensation means 15 can be designed in the manner of a spring-loaded expansion anchor.

Casing 42 can thus undergo an elastic displacement relative to pin body 41, whereby, for example, wear and/or tolerances can be compensated for.

Individual segments 43 can be distributed symmetrically over the circumference of pin body 41, with more preferably at least two, preferably three and even more preferably four individual segments 43 being provided.

Individual segments 43 can form compensation means 15 and, for example, preload casing 42 against pin body 41.

FIGS. 7a and 7b show a fourth exemplary embodiment, in which, in contrast to pin 40 shown in FIGS. 6a and 6b, individual segments 43 are not arranged in the corners of diamond-shaped casing 42, but between the sides of diamond-shaped casing 42 and pin body 41. Individual segments 43 are therefore located in the direct force path between running surfaces 45 of pin 40 and pin body 41.

FIGS. 8a and 8b show a fifth exemplary embodiment, with a single individual segment 43 being provided between casing 42 and pin body 41. Pin body 41 and/or casing 42 can be made of a resilient or solid material, such as, for example, metal, and individual segment 43 can be formed, for example, from an elastic intermediate mass as a compensation means 15, through which casing 42 can be held spring-loaded and/or spring-loaded and preloaded against pin body 41.

As shown in FIGS. 9a and 9b, a rotation lock can be provided between pin body 41 and casing 42, whereby casing 42 is radially stabilized and rotation of casing 42 relative to body 41 is inhibited. For example, the rotation lock can be formed by at least one rib 46 projecting from pin body 41 and/or casing 42, through which a torque-transmitting connection can be formed between the at least one individual segment 43. The rotation lock can be used to form a torsion spring system, through which a spring-loaded rotation between pin body 41 and casing 42 can be brought about to compensate for tolerances and/or play. The rotation lock also prevents pin body 41 and individual segment 43 and/or casing 42 and individual segment 43 from disengaging.

FIGS. 10a and 10b show a further exemplary embodiment. This exemplary embodiment is designed analogously to the previously described exemplary embodiment in FIG. 9, but in this case sheathing 42 is not diamond-shaped but cylindrical.

Figure 11:
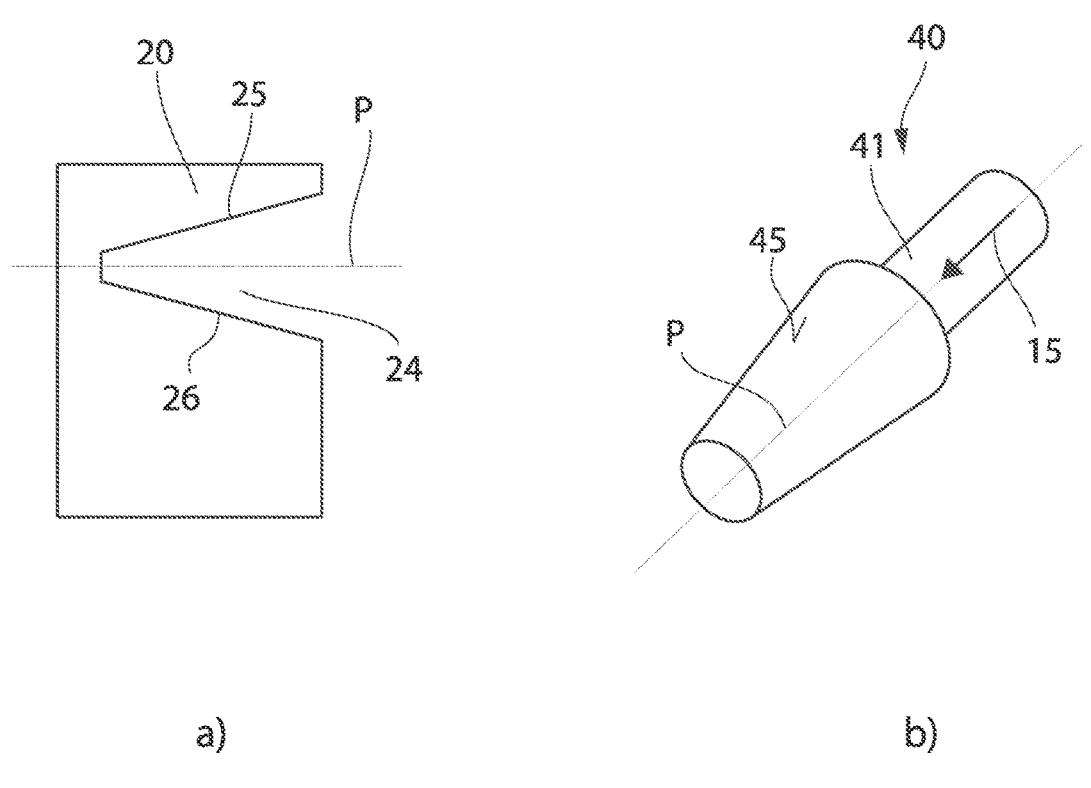
FIG. 11 shows a highly simplified detailed representation of an eighth exemplary embodiment of the linear drive, with two toothed racks arranged opposite one another forming a slotted link, the profile surfaces of which are designed to converge, and the pin is designed to be conical.
Figure 12:
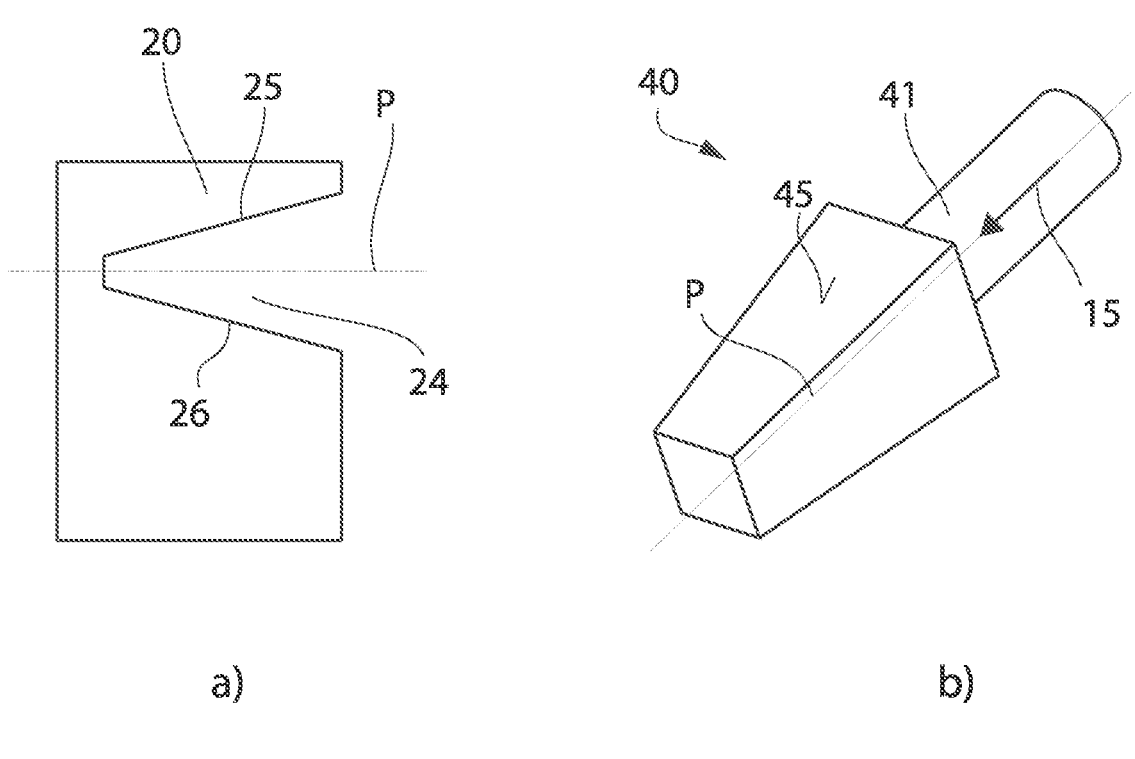
FIG. 12 shows a ninth exemplary embodiment analogous to FIG. 11.

Further exemplary embodiments of a linear drive 1 are shown in FIGS. 11 and 12, the exemplary embodiments shown in FIGS. 11 and 12 having in common that profile surfaces 25, 26 forming slotted link 24 are not arranged parallel to one another. Slotted link 24 has converging profile surfaces 25, 26, whereby the slotted link narrows or widens in pin axis P.

Respective pin 40 can, as shown in FIG. 11b or 12b, have a conical (see FIG. 11b) or pyramid-shaped shape (see FIG. 12b) corresponding to converging profile surfaces 25, 26.

Compensation means 15 can push respective pin 40 in pin axis P into slotted link 24, whereby tolerance compensation can take place.

It should be noted at this point that the shape of pin 40 does not necessarily have to correspond to the shape of profile surfaces 25, 26. The exemplary embodiments shown merely show an exemplary configuration, with the operative contact being brought about by a surface contact or a line contact between respective pin 40 and toothed rack 20 to generate the propulsion. However, the operative contact can also take place through a point contact, for example by respective pin 40 having a convex shape. Such a point or line contact can also be brought about by a combination of converging profile surfaces 25, 26 with non-converging running surfaces of the respective slide 30, and vice versa.

Figure 13:
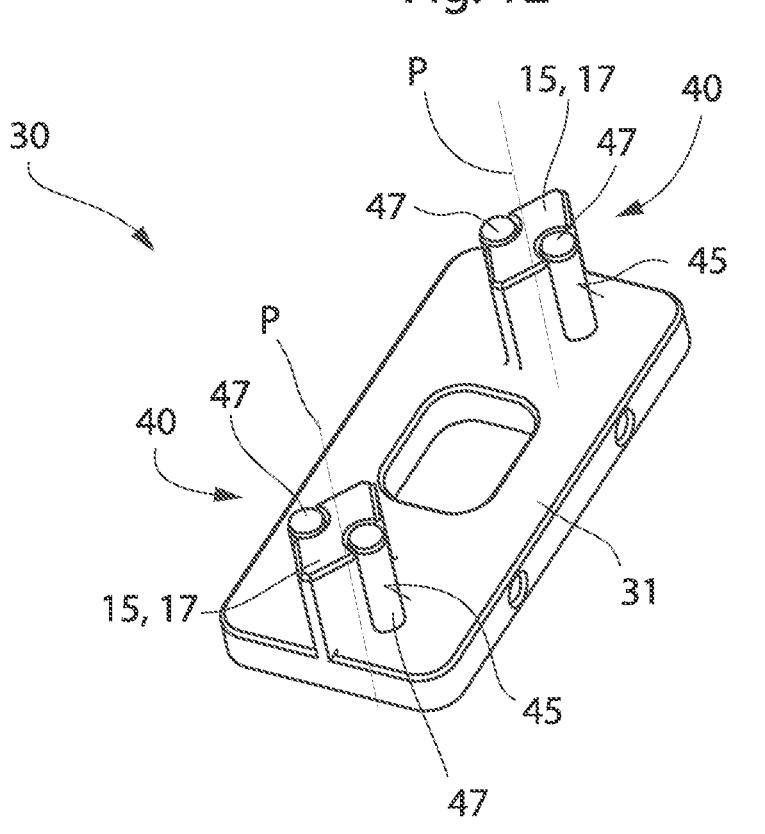
FIG. 13 shows a tenth exemplary embodiment, wherein the slide has two pins, and wherein the respective pin is formed from two individual pins which are preloaded by the compensation means.

FIG. 13 shows an enlarged representation of a slide 30, according to a further exemplary embodiment. Respective pin 40 comprises two individual pins 47, which are preloaded against each other by compensation means 15. As can be seen from FIG. 12, a compensation means 15 formed as an intermediate mass 17 can be arranged between the two individual pins 47, whereby preloading the individual pins 47 against one another is brought about.

The preload can also or additionally be provided by a compensation means 15 that is formed by an excess in the distance between the two individual pins 47 of the contour of slotted link 24. As a result, an individual pin 47 is always under tension and is pressed inwards within its elastic deformation.

Figure 14:
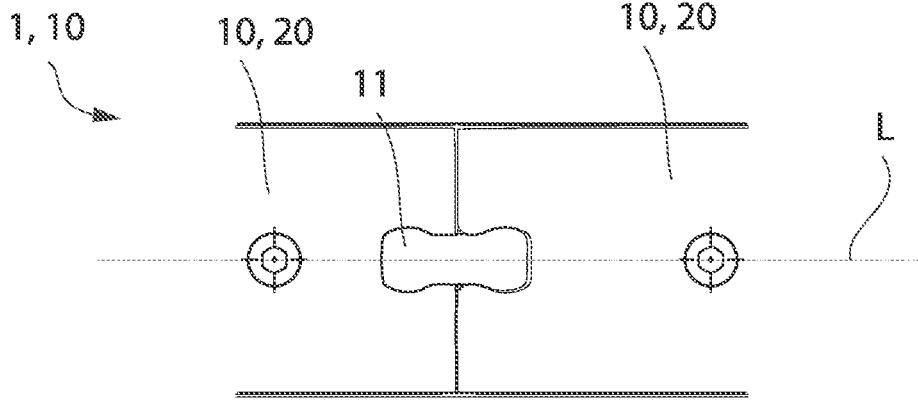
FIG. 14 shows an eleventh exemplary embodiment, wherein the compensation means connects two toothed racks lined up in a row along the longitudinal axis.
Figure 15:
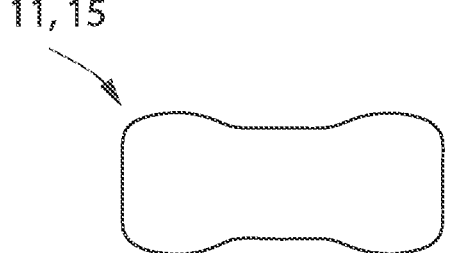
FIG. 15 shows a detailed representation of the compensation means according to FIG. 14.

A final exemplary embodiment is shown in FIGS. 14 and 15, wherein linear drive 1 has several toothed racks 20 or rails 10, 10' that are lined up next to each other. This means that the length of linear drive 1 can be extended as desired.

Two rails 10, 10' or toothed racks 20, which are adjacent in longitudinal axis L, can be connected to one another by a type of dovetail connection. For example, a slot nut 11 shown in FIG. 15 can be used for the connection, which can form compensation means 15. The compensation means enables at least one of toothed racks 20 lined up in a row along longitudinal axis L to be displaced along the longitudinal axis. As a result, one of toothed racks 20 can carry out a compensation movement relative to adjacent toothed rack 20 in the longitudinal axis to compensate for tolerances and/or wear.

LIST OF REFERENCE NUMERALS

1 linear actuator
2 longitudinal adjustment unit 10 rail
15 compensation means
16 edge layer
17 intermediate mass
20 rack
21 tooth profile
22 tooth
24 slotted link
25 profile surface
26 profile surface
30 slide
31 basic body
34 contact region
36 contact surface
40 pin
41 pin body
42 sheathing
43 single segment
45 running surface
46 rib
47 individual pin
60 drive shaft
62 guide means
63 camshaft disk
64 running surface
70 drive device
A1 distance of 25 and 26
A2 tooth spacing
A3 pin spacing
B1 width of 40
L longitudinal axis
P pin axis

The invention claimed is:

1. A linear drive (1), comprising:
at least two oppositely arranged toothed racks (20) oriented along a longitudinal axis (L);
at least two slides (30), each slide comprising at least one pin (40) engaging into a guide groove (24) formed between the two oppositely arranged toothed racks which are movable transversely to the longitudinal axis (L), each of said pins comprising:
a pin core or pin body (41) and a sleeve or casing (42) surrounding the pin core or pin body at least in sections; and
an elastic compensation element arranged between the pin core or pin body and the sleeve/casing and
a drive shaft (60),
wherein the at least two slides (30) are coupled to the drive shaft (60) in such a way that the at least two slides (30) each carry out at least one cyclic and out-of-phase movement in the course of one revolution of the drive shaft (60) and thereby push off by an operative contact with at least one of said two oppositely arranged toothed racks (20) to generate propulsion in a direction of the longitudinal axis (L), said elastic compensation element providing the operative contact between at least one of the at least two slides (30) and the at least one of said two oppositely arranged toothed racks (20) is preloaded so that the elastic compensation element preloads the sleeve/casing relative to the pin core/pin body, to directly elastically preload the operative contact between the sleeve or casing of the pin and the rack.

2. The linear drive (1) according to claim 1, characterized in that the at least one compensation element (15) preloads at least one of the at least two slides (30) and/or the at least one toothed rack (20) substantially transversely to the longitudinal axis.

3. The linear drive (1) according to claim 1, characterized in that
the at least two toothed racks (20) are arranged opposite one another in such a way that a slotted link (20) is formed between the at least two toothed racks (24), in which at least one of the at least two slides (30) engages and can push off alternately on the at least two toothed racks (20) in the course of the cyclic movement.

4. The linear drive (1) according to claim 3, characterized in that
one of the at least two toothed racks (20) is spring-loaded against the oppositely arranged other of the at least two toothed racks (20) by the at least one compensation element (15).

5. The linear drive (1) according to claim 3, characterized in that
the slotted link (24) has two opposite and converging profile surfaces (25, 26).

6. The linear drive (1) according to claim 5, characterized in that
the at least one pin (40) has a shape corresponding to the converging profile surfaces (25, 26).

7. The linear drive (1) according to claim 1, characterized in that
the at least one pin (40) projects into the slotted link (24) in one pin axis (P) in each case.

8. The linear drive (1) according to claim 7, characterized in that
the at least one pin (40) is preloaded by means of the at least one compensation element (15) in a plane transverse to the cyclic movement of the at least one of the at least two slides (30) and/or that the at least one pin (40) is preloaded in the pin axis (P) by means of the at least one compensation element (15).

9. The linear drive (1) according to claim 1, characterized in that
the at least one pin (40) is pyramid-shaped or conical at least in sections.

10. The linear drive (1) according to claim 1, characterized in that
the at least one pin (40) is formed from at least two individual pins (47).

11. The linear drive (1) according to claim 10, characterized in that
the at least one compensation element (15) is arranged between the individual pins (47) and preloads the at least two individual pins (47).

12. The linear drive (1) according to claim 1, characterized in that
the at least one compensation element (15) preloads the at least one of the at least two slides (30) and/or the at least one toothed rack (20) in the orientation of the longitudinal axis (L).

13. The linear drive (1) according to claim 1, characterized in that
the operative contact between the at least one toothed rack (20) and at least one of the at least two slides (30) is a surface contact, a line contact or a point contact.

14. The linear drive according to claim 1, characterized in that
the at least one compensation element (15) comprises an edge layer (16) which is arranged at the at least one toothed rack (20) and/or on the at least one slide (30).

15. A longitudinal adjustment unit (2) comprising a linear drive (1) according to claim 1.

16. A motor vehicle having a linear drive (1) according to claim 1.

17. A linear drive (1), comprising at least two toothed racks (20) oriented along parallel longitudinal axes (L), the at least two toothed racks (20) arranged opposite one another in such a way that a slotted link (20) is formed between the at least two toothed racks (20);

at least two slides (30) which are movable transversely to the longitudinal axes (L); and a drive shaft (60), wherein the at least two slides (30) are coupled to the drive shaft (60) in such a way that the at least two slides (30) each carry out at least one cyclic and out-of-phase movement in the course of one revolution of the drive shaft (60) and thereby push off by an operative contact at the at least one toothed rack (20) to generate propulsion in a direction of the longitudinal axes (L), wherein the linear drive (1) has at least one elastic compensation means (15), by means of which the operative contact between at least one of the at least two slides (30) and the at least one toothed rack (20) is preloaded; and said at least two slides each having at least one pin assembly (40) comprising at least two individual pins (47) projecting into the slotted link (24) in parallel with at least one pin axis (P), and that the at least one slide (30) is in operative contact with at least one of said two toothed racks (20) by means of the at least one pin assembly (40), said pin assembly having the preload by means of the at least one elastic compensation means (15) in a plane transverse to the cyclic movement of the at least one of the at least two slides (30) and/or that the at least one pin assembly (40) is preloaded against said at least one of said two toothed racks (20) as a result of the preload by said at least one elastic compensation means (15), the at least one pin is displaced along the one of the parallel longitudinal axes (L) by said at least one elastic compensation means, thereby compensating for wear and/or tolerances.

18. The linear drive (1) according to claim 17, wherein the slotted link (24) has two opposite and converging profile surfaces (25, 26), and the at least one pin assembly (40) has a shape corresponding to the converging profile surfaces (25, 26).

* * * * *